Patented July 12, 1949

2,475,664

UNITED STATES PATENT OFFICE 2,475,664

VULCANIZED COPOLYMERS OF DRYING OILS AND DIENE HYDROCARBONS

Howard L. Gerhart, Milwaukee, Wis., assignor to Pittsburgh Plate Glass Company, Allegheny County, Pa., a corporation of Pennsylvania No Drawing. Application May 23, 1945, Serial No. 595,479

22 Claims. (Cl. 260—23.7)

The present invention relates to the hardening of unsaturated resins of the addendum type and it has particular relation to the hardening of the resins obtained by conjointly polymerizing a mixture of cyclopentadiene or a lower polymer (dimer, trimer, tetramer, or pentamer) and an unsaturated glyceride oil.

Some of the objects of the invention are:

A. To provide a simple and convenient method of quickly converting relatively tacky, easily deformable, and slow hardening addendum resins into a hard and durable state;

B. To provide as a new product a hard, infusible, resinous product comprising a copolymer of cyclopentadiene or its lower polymers and an unsaturated glyceride oil;

C. To provide a plastic composition which readily wets fibrous materials or fillers such as asbestos, and which still can be readily hardened by application of heat;

D. To provide a composition which is particularly adapted for use as a friction element in brake linings, clutches, and the like.

It has heretofore been proposed to provide an addendum resin by conjointly polymerizing certain cyclicdiene hydrocarbons, notably cyclopentadiene or its lower polymers and an unsaturated glyceride oil such as linseed oil, soya bean oil, tung oil, or the like. These copolymer resins have been admixed with fibrous material such as asbestos fibers and after baking have been employed as the friction elements in brake drums and friction clutches. This material, however, hardens only slowly and the interior of a thick body such as a brake band or a clutch plate will retain a certain degree of tack and flow for a very long period of time.

The present invention contemplates a method of treating the foregoing materials whereby they are easily, economically, and quickly hardened to an infusible resistant state in which they are eminently suited for use as friction elements in brakes, clutches, and the like. As one feature, the invention consists in the incorporation of the copolymer resin with sulphur and its subsequent subjection to a baking operation in order to effect vulcanization. Another feature of the invention includes the incorporation of certain esters such as pentaerythritol esters of acids from linseed oil or other animal or vegetable oil, notably of an unsaturated nature to promote wetting of fillers such as asbestos fibers, etc. A still further feature involves the incorporation of so-called friction dusts such as diatomaceous earth or the like to improve the friction characteristics.

In the practice of the invention, a copolymer resin is prepared by admixing and copolymerizing unsaturated glyceride oils, cyclopentadiene or its lower polymers, above mentioned, and which may therefore be termed a diene compound consisting of one or more five sided rings, empirically of the formula ($C_5H_6$), there being present in each molecule at least two double bonds. Methods of polymerizing mixtures of these materials to form resins are disclosed in my copending applications: Serial No. 512,769, filed December 3, 1943, Patent No. 2,387,895; Serial No. 323,944, filed March 14, 1940, Patent No. 2,392,732; Serial No. 512,766, filed December 3, 1943, Patent No. 2,392,142.

These all disclose conjointly polymerizing a glyceride oil such as linseed oil, and monomeric or polymeric cyclopentadiene. Polymerization may be effected by heating a mixture of oil and cyclopentadiene say to a temperature of 50° or 60° C. in the presence of a catalyst such as tin tetrachloride or preferably by heating oil and a lower polymer of cyclopentadiene, e. g. a dimer in a closed system to a fairly high temperature (200 or 300° C.) until the product is of desired consistency. Considerable variation of the ratio of oil to cyclic hydrocarbon is admissible, though products containing a fairly high ratio of hydrocarbon are desirable. In most instances, the ratio of cyclopentadiene or its lower polymer will be 50% or above based upon the oil-hydrocarbon mixture and not much above 70% upon the same basis.

The preparation of a suitable resin for use in the practice of the invention is illustrated as follows: A mixture of about 54 parts by weight of bodied linseed oil and 35 parts by weight of dicyclopentadiene was heated according to the following schedule in an autoclave.

| Time | ° F. | Pressure | Viscosity |
|---|---|---|---|
| 0:00 | ---- | -------- | |
| 1:00 | 295 | -------- | |
| 1:30 | 370 | 25 | |
| 2:00 | 435 | 50 | |
| 2:30 | 485 | 35 | |
| 3:00 | 527 | 40 | |
| 4:00 | 527 | 20 | A-1 Gardner-Holdt. |
| 5:00 | 527 | 10 | A. |
| 5:30 | 518 | 5 | C. |
| Cool 5:50 | 510 | -------- | E. |
| Drop 6:10 | 350 | -------- | |

When the mixture in the autoclave has reached a viscosity of "E" at 50% in petroleum naphtha, it is dropped from the autoclave into a quantity of naphtha sufficient to give a 70% solution of the resin in the naphtha; that is, the total solid resin content is 70%. This constitutes the vehicle for the molding operation.

If a tougher product is desired, the ratio of dicyclopentadiene to oil may be increased. One such formulation would comprise: linseed oil—40 parts by weight, dicyclopentadiene—50 parts by weight. Such mixture copolymerizes somewhat faster than the one given above. Reaction conditions are otherwise substantially identical.

The resins after preparation may be admixed with or dissolved in a suitable solvent medium such as petroleum hydrocarbon, naphtha, or the like. A small amount of sulphur and a filler such as ground asbestos, wood flour, macerated cloth, walnut shell flour, cotton fibers, cloth fillers, fiber glass or other inert filler materials are added. Preferably the amount of the solvent medium is sufficient to provide a putty-like mass which is sufficiently plastic to be extrudable or moldable into desired configuration. Vulcanizing agents including sulphur, and vulcanization accelerators such as mercaptobenzothiazole, benzothiazeyldisulphide, diphenylguanidine, hexamethyltetramine, thiuramdisulphide, piperidinium pentamethylene dithiocarbamate, mixtures of methylene dianilide and formaldehyde aniline, condensation product of acetaldehyde and aniline, zinc dibutyl dithiocarbamate, zinc diethyl dithiocarbamate, and the like may also be introduced. Other modifying agents such as zinc oxide, stearic acid, carbon black and the like can also include the appropriate amounts. A convenient ratio of zinc oxide and stearic acid would, for example, be approximately of the range of 5 to 15 per cent respectively.

Example I

A convenient formulation in parts by weight would be approximately as follows:

| | Parts |
|---|---|
| Oil-cyclopentadiene copolymer | 80 |
| Sulphur | 3 |
| Vulcanization accelerator | 1 |
| Ground asbestos | 300 |

Enough gasoline or naphtha is added to render the mixture extrudable.

In the manufacture of brake bands, the mixtures are extruded preferably as continuous strips which are cut to appropriate length, placed in molds of desired configuration, and then subjected to cure first preliminary at 75° C., and finally at a baking temperature of about 150–200° C. for a period of one to five hours.

Example II

In a second formulation, a mixture of:

| | Parts |
|---|---|
| Fibrous asbestos (containing 20% diatomaceous earth) | 3975 |
| Sulfur | 25 |
| Accelerator | 8 |
| Above resin (70% solids) | 1150 |
| Gasoline | 255 | is placed in a Banbury mixer and thoroughly mixed. This mixture, which has the consistency of a mush is extruded through a die in the shape of a band and is subsequently heated in an oven to drive off substantially all of the solvents. It is then compressed to the exact shape desired in the final product and baked in an oven for two hours at 204° F.

The ratio of the sulfur to resin can be varied over wide limits. A convenient ratio of sulfur is from 3–20% of the weight of resin. The ratio of accelerator to sulfur is approximately 1–3. In general, the higher the ratio of sulfur to resin, the more rapidly does the mixture cure and the harder is the molded piece.

It is advisable in order to obtain the greatest hardness to mold these mixtures under from 100–1000 lbs./sq. in. pressure before the curing process. The entire curing process may take place in the mold or as a convenience, it is possible to simply use the molding operation to preform the piece and to complete the cure in an oven.

It has been found that the addition of 600 parts of water to the mixture in the Banbury mill will enable the extrusion process to proceed more easily because water improves the flow of the mixture through the die. Where asbestos fibers are present the wetting characteristics of the compound with respect to the fibers may be improved by the addition of a small amount of water to the mixture. Approximately 2% of water based upon the weight of the compound is sufficient though more or less may be employed.

In order to improve the mixing characteristics of the compound with respect to the asbestos fibers, it may be desirable to incorporate an appropriate amount of a modifier such as pentaerythritol esters of unsaturated acids of fatty oils such as linseed oil. Suitable esters may be prepared by the simple esterification of one mol of pentaerythritol and three mols of linseed oil acid.

As previously stated, the mixture may also include a friction material such as diatomaceous earth designed to improve the coefficient of friction of the material with respect to brake drums or friction plates. This ingredient is included in substantially any desired ratio although approximately 20% based upon the weight of the total mixture will be satisfactory for the purpose.

The embodiments of the invention herein disclosed are merely to be considered as examples. It will be apparent to those skilled in the art that numerous modifications may be made therein without departure from the spirit of the invention or the scope of the appended claims.

What I claim is:

1. As a new product the molded, hard, infusible vulcanizate of sulfur and a copolymer of a glyceride drying oil and a diene hydrocarbon of a class consisting of cyclopentadiene and its lower homopolymers up to the pentamer.

2. The product as defined in claim 1 in which the oil is linseed oil.

3. The product as defined in claim 1 in which the vulcanizate is admixed with asbestos fibers.

4. A new product as defined in claim 1 in which the vulcanizate includes asbestos fibers and pentaerythritol esters of fatty acids.

5. A product as defined in claim 1 which further includes wood flour.

6. As a new product, a hard infusible vulcanizate of sulfur and a copolymer of a glyceride oil and a diene hydrocarbon of a class which consists of cyclopentadiene and its lower homopolymers up to the pentamer and an inert filler.

7. A friction element for brake bands, clutches, and the like consisting of the product defined in claim 1 molded to suitable form and containing an inert fibrous filler.

8. A molding compound comprising a copolymer of a drying glyceride oil and a diene hydrocarbon of a class consisting of cyclopentadiene and its lower polymers up to the pentamer, said copolymer being mixed with an inert filler material to form a plastic moldable composition, and sulfur for vulcanizing the copolymer.

9. A composition as defined in claim 8 which is of improved extrudability by reason of the presence therein of water.

10. A method of preparing a vulcanized resin product which comprises mixing a copolymer of a drying oil and cyclopentadiene with 3 to 20% of sulfur based upon the weight of resin of sulfur and heating the mixture to a temperature of 150 to 200° C. until it is cured to a hard and infusible state.

11. A method of preparing a vulcanized resin product which comprises mixing a copolymer of cyclopentadiene and a drying oil with about 3 to 20% of sulfur based upon the copolymer resin and heating the mixture until it is cured to a hard infusible state.

12. A method of preparing a vulcanized resin product which comprises mixing with sulfur a copolymer of a drying oil and a diene hydrocarbon of a class which consists of cyclopentadiene and its lower homopolymers up to the pentamer, the hydrocarbon being in a range of 50 to 70% of the copolymer to provide a mixture containing 3 to 20% of sulfur based upon the resin content and heating the mixture until it is cured to a hard infusible state.

13. A method of preparing a vulcanized resin product which comprises mixing with sulfur a copolymer of a drying oil and a diene hydrocarbon consisting of 1 to 5 $C_5H_6$ groups in the form of five sided rings per molecule, the hydrocarbon being in a range of 50 to 70% of the copolymer, and heating the mixture until it is cured, curing being effected at a temperature of 150 to 200° C. for a period of 1 to 5 hours.

14. A vulcanizate of sulfur and a copolymer of a drying oil and a cyclic diene hydrocarbon consisting of 1 to 5 $C_5H_6$ five sided rings per molecule, the hydrocarbon comprising 50 to 70% of the copolymer.

15. A sulfur vulcanizate of a copolymer of a drying oil and a cyclic diene hydrocarbon containing 1 to 5 $C_5H_6$ five sided rings per molecule, the hydrocarbon comprising 50 to 70% of the copolymer and the sulfur being in a range of 3 to 20% based upon the resin.

16. A composition adapted to be shaped and cured to provide a friction element, said composition comprising a copolymer of a drying glyceride oil and a diene hydrocarbon consisting of 1 to 5 $C_5H_6$ five sided rings per molecule, the hydrocarbon constituting 50 to 70% of the composition, the composition further comprising 3 to 20% of sulfur, inert filler and a hydrocarbon solvent of the copolymer in an amount to form a putty-like extrudable mass.

17. The friction body obtained by heating a shaped portion of the composition defined in claim 16 to the temperature of vulcanization until it is cured to a hard, durable state.

18. A process of forming a friction body, which process comprises mixing a copolymer of a glyceride drying oil and a diene hydrocarbon containing 1 to 5 $C_5H_6$ five sided rings per molecule, the hydrocarbon constituting 50 to 70% of the copolymer, with 3 to 20% of sulfur by weight upon the basis of the resin content, inert filler and a petroleum hydrocarbon solvent for the copolymer to form a putty-like mass, shaping the mass to desired form and vulcanizing it by application of heat and pressure to a hard infusible state.

19. A process as defined in claim 18 in which vulcanization is effected by application of a temperature of 150 to 200° C. for a period of 1 to 5 hours.

20. A composition as defined in claim 16 which further contains a rubber vulcanization accelerator.

21. A composition as defined in claim 16 in which the copolymer and the inert filler are in about the ratio of 80 and 300 parts by weight.

22. A process as defined in claim 18 in which the copolymer and filler are added in the ratio of 80 and 300 parts respectively and the mixture is cured at a temperature of 150 to 300° C.

HOWARD L. GERHART.

REFERENCES CITED

The following references are of record in the file of this patent:

UNITED STATES PATENTS

| Number | Name | Date |
| --- | --- | --- |
| 1,720,929 | Staudinger | July 26, 1929 |
| 2,380,149 | Chaney | July 10, 1945 |
| 2,390,530 | Gerhart et al. | Dec. 11, 1945 |
| 2,394,816 | Soday | Feb. 12, 1946 |